(12) United States Patent
Vander Lind

(10) Patent No.: US 10,144,510 B1
(45) Date of Patent: Dec. 4, 2018

(54) TETHERED WIND TURBINE USING A STOPPED ROTOR AIRCRAFT

(71) Applicant: Kitty Hawk Corporation, Mountain View, CA (US)

(72) Inventor: Damon Vander Lind, Oakland, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 184 days.

(21) Appl. No.: 15/197,320

(22) Filed: Jun. 29, 2016

(51) Int. Cl.
| B64C 39/02 | (2006.01) |
| B64C 29/00 | (2006.01) |
| B64F 3/00 | (2006.01) |
| F03D 9/32 | (2016.01) |
| B64C 27/30 | (2006.01) |
| B64D 27/24 | (2006.01) |

(52) U.S. Cl.
CPC ............ *B64C 39/022* (2013.01); *B64C 27/30* (2013.01); *B64C 29/0025* (2013.01); *B64D 27/24* (2013.01); *B64F 3/00* (2013.01); *F03D 9/32* (2016.05); *B64D 2221/00* (2013.01)

(58) Field of Classification Search
CPC ... B64C 39/022; B64C 29/0025; B64C 27/24; B64C 27/30; B64F 3/00; F03D 9/32
See application file for complete search history.

(56) References Cited

U.S. PATENT DOCUMENTS

| 6,781,254 | B2* | 8/2004 | Roberts | F03D 13/20 290/55 |
| 7,317,261 | B2* | 1/2008 | Rolt | B64C 39/022 290/55 |
| 7,675,189 | B2* | 3/2010 | Grenier | F03D 15/10 290/54 |
| 8,350,403 | B2* | 1/2013 | Carroll | B64C 39/022 290/55 |
| 2010/0013226 | A1* | 1/2010 | Blumer | B64B 1/50 290/44 |
| 2010/0032947 | A1* | 2/2010 | Bevirt | F03D 1/065 290/44 |
| 2010/0156102 | A1* | 6/2010 | Grenier | F03D 15/10 290/44 |
| 2010/0221112 | A1* | 9/2010 | Bevirt | F03D 5/00 416/135 |
| 2010/0295320 | A1* | 11/2010 | Bevirt | B64C 39/022 290/55 |
| 2011/0057453 | A1* | 3/2011 | Roberts | F03D 1/02 290/55 |
| 2011/0121570 | A1* | 5/2011 | Bevirt | F03D 5/06 290/44 |

(Continued)

OTHER PUBLICATIONS

Robert A. Ormiston, "Realizing the Potential of the Compound Helicopter", in Vertiflite, vol. 62, No. 3, pp. 48-51, May/Jun. 2016.

(Continued)

*Primary Examiner* — Michael H Wang
(74) *Attorney, Agent, or Firm* — Van Pelt, Yi & James LLP

(57) ABSTRACT

A system which includes a stoppable rotor which is configured to launch a stopped rotor aircraft into flight. The system also includes one or more wind turbines which are configured to generate electricity while the stopped rotor aircraft is flying, where the stoppable rotor is stopped at least some of the time while electricity is generated.

18 Claims, 15 Drawing Sheets

(56) References Cited

U.S. PATENT DOCUMENTS

| | | | |
|---|---|---|---|
| 2011/0186687 A1* | 8/2011 | Elder | B64C 31/06 244/155 A |
| 2011/0260462 A1* | 10/2011 | Vander Lind | A63H 27/002 290/55 |
| 2011/0266395 A1* | 11/2011 | Bevirt | F03D 5/00 244/155 R |
| 2011/0266809 A1* | 11/2011 | Calverley | F03D 5/00 290/55 |
| 2012/0104763 A1* | 5/2012 | Lind | B64C 31/06 290/55 |
| 2012/0248770 A1* | 10/2012 | Byun | F03D 1/025 290/44 |

OTHER PUBLICATIONS

Robert A. Orniston, "Revitalizing Advanced Rotorcraft Research—and the Compound Helicopter: 35th AHS Alexander A. Nikolsky Honorary Lecture", in Journal of the American Helicopter Society, vol. 61, No. 1, pp. 1-23. Jan. 2016.

Saberi et al., "Overview of RCAS Capabilities, Validations, and Rotorcraft Applications", Presented at the AHS 71st Annual Forum, Virginia Beach, Virginia, May 5-7, 2015.

Rancourt et al., "Optimal Flight Path of the Tethered Airplanes in the $EPR^2$ VTOL Concept During Moderate Flight Velocity", Presented at the AHS Technical Meeting on Aeromechanics Design for Vertical Lift, Jan. 20-22, 2016.

Energy Kites, downloaded from https://www.google.com/makani/, Captured on May 25, 2016.

Youtube screenshots, Makani Energy Kite video, taken from https://www.youtube.com/watch?v=GSYMHzgLLn8, Captured on Mar. 25, 2014.

* cited by examiner

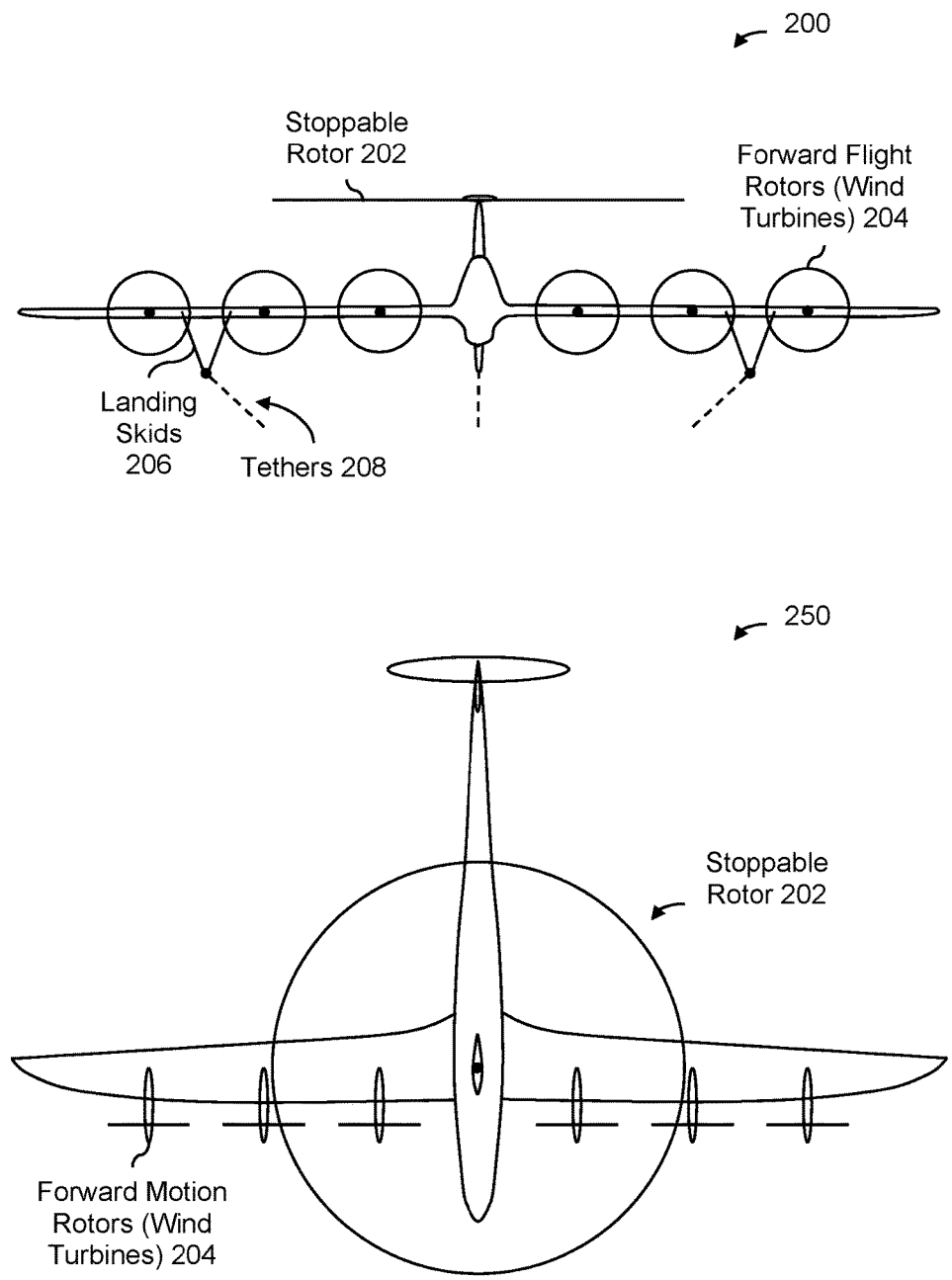
FIG. 2A  Not Necessarily to Scale

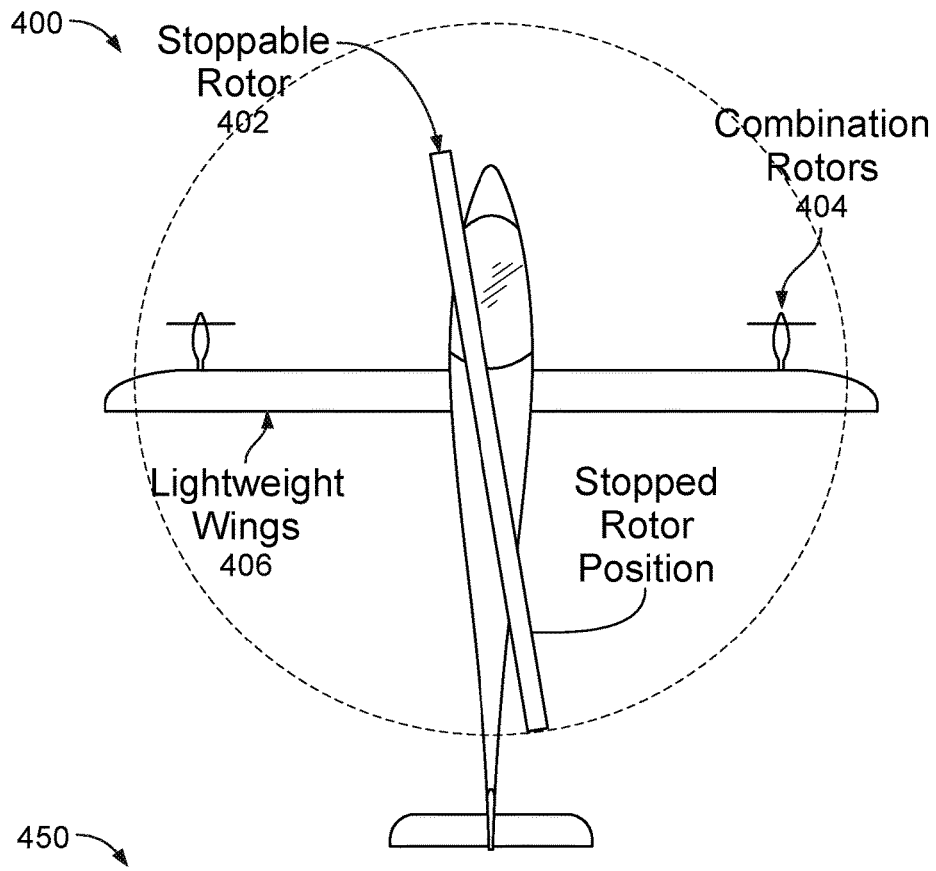
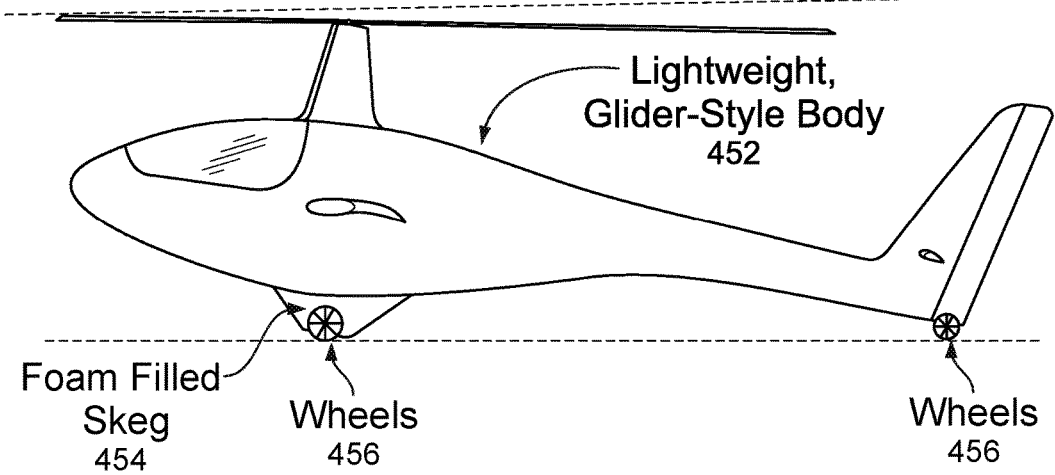
FIG. 4

FIG. 12    Not Necessarily to Scale

TETHERED WIND TURBINE USING A STOPPED ROTOR AIRCRAFT

BACKGROUND OF THE INVENTION

A relatively new idea in the field of renewable energy is to use an aircraft to generate electricity from wind energy. For example, instead of having a stationary tower with wind turbines attached, the wind turbines may be part of the rotors or propeller system of an aircraft and while airborne generates electricity from the wind. Although such systems offer a number of benefits over stationary towers (e.g., the aircraft can be moved to where the wind is blowing and/or the aircraft can reach relatively high altitudes where the wind is stronger and/or more consistent), further improvements would be desirable.

BRIEF DESCRIPTION OF THE DRAWINGS

Various embodiments of the invention are disclosed in the following detailed description and the accompanying drawings.

FIG. 2A is a diagram illustrating an embodiment of a stopped rotor aircraft with a single stoppable rotor for launch and six wing-mounted forward flight rotors.

FIG. 4 is a diagram illustrating an embodiment of a stopped rotor aircraft with a foam filled skeg and wheels for various types of landing.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
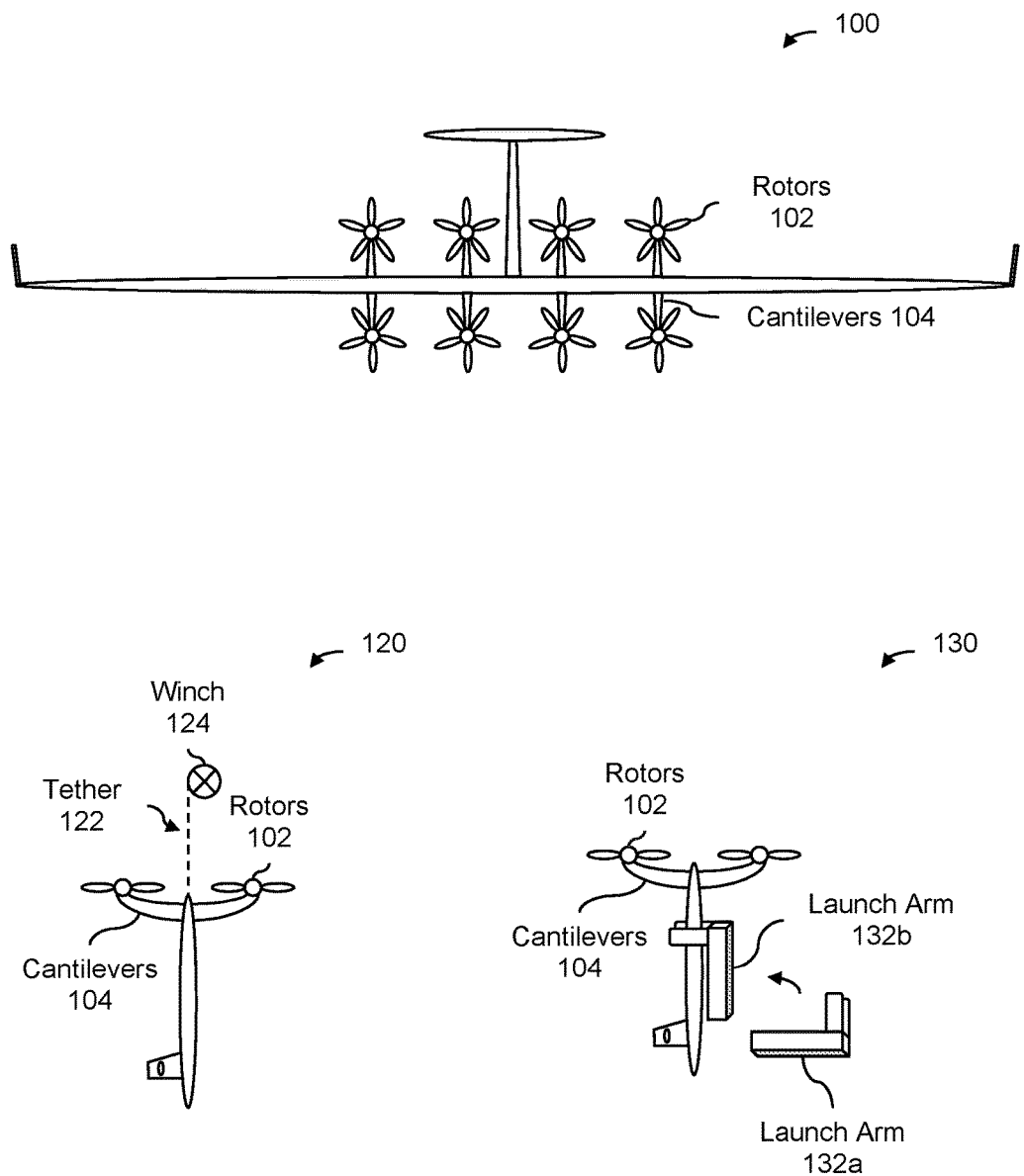
FIG. 1 is a diagram illustrating an embodiment of another type of aircraft used to generate electricity from wind energy.

FIG. 1 is a diagram illustrating an embodiment of another type of aircraft used to generate electricity from wind energy. Diagram 100 shows a front view of the aircraft. In this example, the aircraft has eight rotors (102) mounted in two rows to the wings of the aircraft: four above the wings and four below the wings.

The rotors in this design serve multiple purposes. During takeoff, the rotors provide upward lift to launch the aircraft into the air. In this design, the rotors are fixed and cannot be angled. As such, one of the primary downsides of this configuration is that the aircraft needs to be in a nose up and tail down position before the aircraft can be launched. A typical solution to this problem is to mount the aircraft to a tower or perch while not flying, which adds additional structure and complexity to the system. Further, the placement of the wing perpendicular to the wind places high loads on the tether and winch during the reel in and the reel out of the tether during launch and land, increasing total system cost and complexity.

Diagrams 120 and 130 shows two types of launch equipment which may be used to put the aircraft into the proper launch position (i.e., nose up and tail down). In diagram 120, a tether (122) is attached to the front of the aircraft. The aircraft can initially be in a horizontal position (not shown), for example on the ground or on the bed of a flatbed trailer. The winch (124) is gradually tightened until the tether (122) lifts the aircraft up, nose first. Eventually the aircraft is lifted off of the ground with the nose of the aircraft facing upwards and the tail facing downward. The rotors can then be used to perform a vertical takeoff (with more slack provided so that the aircraft can enter a looping pattern in which electricity is generated), or the aircraft may be placed on a perch which is later used as a platform for launch Diagram 130 shows another type of launch equipment for positioning the aircraft. In that example, a launch arm (132*a* and 132*b*) is used to lift up the aircraft and position it so that it is facing nose up and tail down. The launch arm clamps onto the aircraft, which is initially positioned horizontally (not shown). Launch arm 132a shows this starting position. To preserve the readability of the diagram, launch arm 132a does not show the aircraft in its grip. The launch arm (with the aircraft attached) is then raised into position. Launch arm 132b shows the launch arm in launch position with the attached aircraft facing nose up and tail down. The rotors can then be used to perform a vertical takeoff.

Once launched, and once the vehicle has been transitioned to crosswind flight, the rotors (102) are used to generate electricity from the wind. To do this, the aircraft enters into a circular flight path. To get the aircraft into the circular flight path, the aircraft climbs upward, circles back down, and then climbs upward again, all while tracing a circle in the sky. A tether ties the aircraft to some base station on the ground (not shown). Once in this circular pattern, the tether is taut from the aircraft pulling on it (e.g., where the length of the tether can be adjust and/or the flight pattern of the aircraft can be modified in order to achieve a desired tautness). Once in this circular pattern with the tether taut, the air moving over the rotors forces the rotors to rotate, generating electricity. Conceptually, the aircraft in this mode acts like a kite where the air is keeping the aircraft aloft and the rotors do not need to be powered anymore. Instead, the air moving over the rotors forces the rotors (i.e., wind turbines) to rotate, generating electricity.

One problem with using such an aircraft to generate electricity is the inefficiency of the launch. Generally speaking, the blades of the rotors in this aircraft are optimized for electricity generation and/or maintaining a circular flight path; they are not optimized for vertical lift. For example, the blades of the rotors are relatively short (e.g., compared against the wingspan of the aircraft). A longer blade design would be more efficient at providing lift for launch, but would be inefficient or obnoxiously loud when in generation. Other blade characteristics or blade design features not shown in diagram 100 (e.g., airfoil shape, blade angle, blade twist, solidity, etc.) may also be optimized in this example for electricity generation and/or maintaining a circular flight path as opposed to launch performance.

The following figure shows an example of a stopped rotor aircraft which offers a number of advantages (including, but not limited to, better launch performance) when used to generate electricity compared to the aircraft shown in this figure.

FIG. 2A is a diagram illustrating an embodiment of a stopped rotor aircraft with a single stoppable rotor for launch and six wing-mounted forward flight rotors. Although this example shows six forward flight rotors, any number of rotors may be used to generate electricity. This embodiment is merely exemplary and is not intended to be limiting; a variety of stopped rotor aircraft embodiments are described below.

Diagram 200 shows a front view of this stopped rotor aircraft embodiment and diagram 250 shows a top view. In this example, the stopped rotor aircraft includes a stoppable rotor (202), six forward flight rotors (204), landing skids (206), and tethers (208) which connect the stopped rotor aircraft to a ground station (not shown). It is noted that diagrams 200 and 250 represent stoppable rotor 202 in motion using a circle, but stoppable rotor 202 can and does stop rotating at times. Because the generation rotors no longer need to provide pitch stability in hover, they need not be mounted on vertical pylons that add complexity to the structure.

In this example, the stopped rotor aircraft includes a single stoppable rotor (202) which is mounted to the top of the aircraft (e.g., like a helicopter). During launch, the stoppable rotor (202) provides the lift to launch the aircraft. For example, the stopped rotor aircraft may be on the ground or on the bed of a trailer with the stoppable rotor facing up. From this position, the single stoppable rotor can take off vertically (e.g., like a helicopter) using the stoppable rotor.

When the stopped rotor aircraft in the circular flight path generating electricity, the stoppable rotor is stopped in some desired position, for example with one blade (e.g., a specific one) facing forward and the other blade facing backward. In this position, the stoppable rotor is stable and minimizes drag.

The stopped rotor aircraft in this example also includes six wing-mounted forward flight rotors. During launch, the forward flight rotors are not used to provide the vertical lift to take off. Rather, as will be described in more detail below, they act as counter-torque rotors which compensate for the torque induced by the stoppable rotor (e.g., similar to a tail rotor on a helicopter).

Once the stopped rotor aircraft reaches a sufficient altitude after launch, the stopped rotor aircraft will try to enter the circular flight path. The forward flight rotors may initially be powered on (e.g., to provide forward flight) as the stopped rotor aircraft tries to enter the circular flight path. Power to the forward flight rotors may be turned off once the stopped rotor aircraft is consistently or steadily flying in the circular flight path. With the power to the forward flight rotors turned off, the forward flight rotors act as wind turbines, generating electricity as the wind forces the forward flight rotors to rotate.

In some embodiments, the electricity generated is passed down to the ground station for storage through the tethers (208). In various embodiments, the ground station may include batteries for storing the electricity generated and passed through the tether, may include a winch for adjusting the length of the tether, may be sufficiently heavy to anchor the stopped rotor aircraft when airborne, and/or may be portable (e.g., it includes wheels and may be hitched to the back of a truck). In some other embodiments, the aircraft includes batteries for storing the electricity generated. Alternately, in some embodiments, the aircraft auto-rotates or glides down to the ground in the case of a grid failure.

One benefit to using a stopped rotor aircraft (one embodiment of which is shown here) to harvest wind energy is that it offers better launch performance compared to other systems (see, e.g., FIG. 1). Generally speaking, the stoppable rotor of a stopped rotor aircraft is optimized for hovering or vertical lift performance (e.g., as opposed to being optimized for forward flight and/or generation of electricity). For example, having a single rotor with longer blades (as shown here) enables the aircraft to be launched with less power than having many rotors with shorter blades (as is shown in FIG. 1). Other features or characteristics of the stoppable rotor (not necessarily shown here) may also be optimized for hovering and/or vertical lift, such as the blade curvature, blade angle, and/or aspect ratio. Since stopped rotor aircrafts have better launch performance, the system can more quickly get to a point where it has generated enough power to offset the power spent launching the aircraft and is net positive with respect to power generation.

Another benefit to using a stopped rotor aircraft is that no special launch equipment is required to get the aircraft into launch position. See, for example, diagrams 120 and 130 in FIG. 1 where a winch and launch arm are respectively used to put that type of aircraft into proper launch position with the nose facing up and the tail facing down. Since no special launch equipment is required, the associated cost goes down and/or the aircraft can be employed in more types of terrains or surfaces.

Another benefit to the stopped rotor aircraft shown here is that the forward flight rotors are mounted in a single row directly to the wing. In contrast, the aircraft shown in FIG. 1 has two rows of rotors, where the rotors are connected to the wing via cantilevers (104). By mounting the forward flight rotors directly to the wing without the use of cantilevers, the cost can be reduced.

Figure 2B:
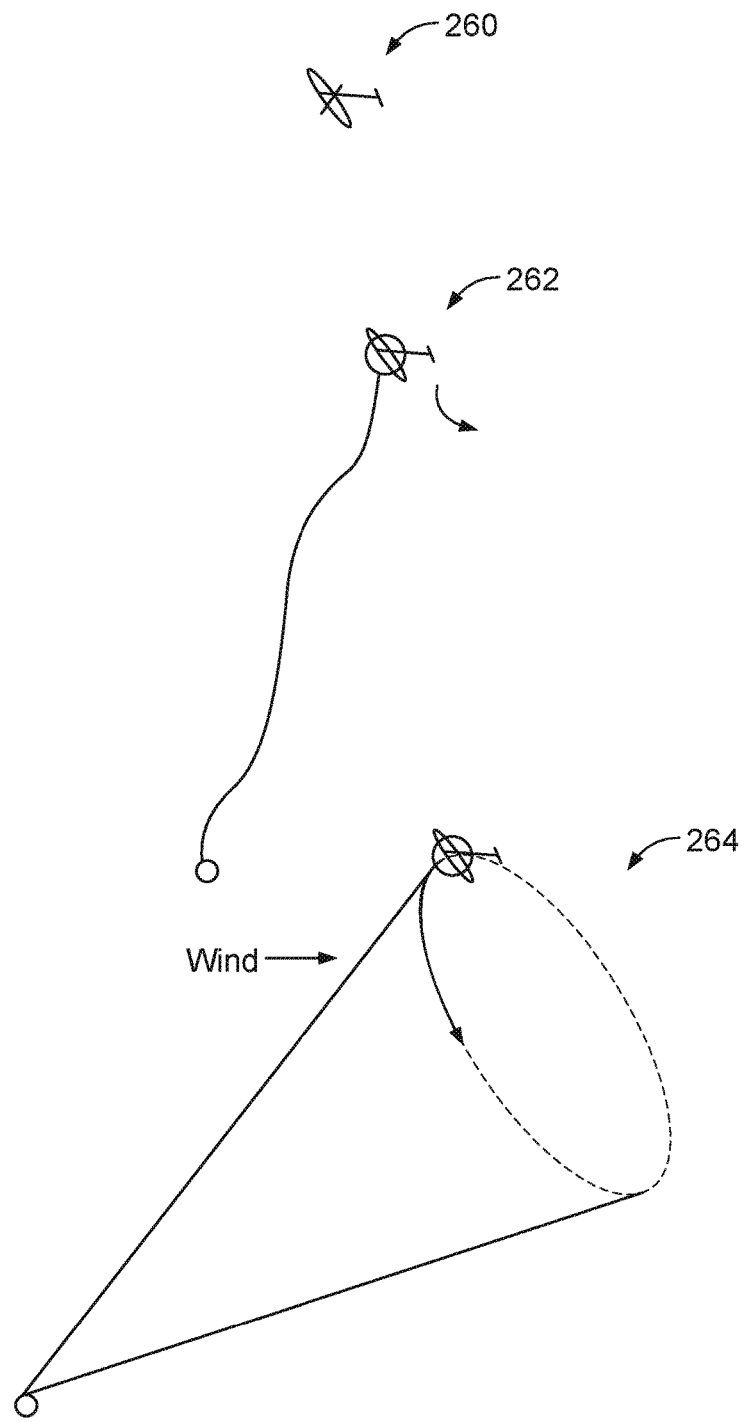
FIG. 2B is a diagram illustrating an embodiment of the stopped rotor aircraft in use.

FIG. 2B is a diagram illustrating an embodiment of the stopped rotor aircraft in use. Diagram 260 shows the stopped rotor aircraft on the ground. Although not shown in that diagram, the aircraft is connected to some ground station via some tether (e.g., which may be slack when the aircraft is on the ground).

Diagram 262 shows the stopped rotor aircraft after takeoff and about to enter into the circular flight path. In this example, the stopped rotor aircraft will dive down to put the aircraft into the circular flight path. It is noted that the stoppable rotor is rotating in this diagram and the tether has some slack (i.e., it is not taut).

Diagram 264 shows the stopped rotor aircraft once the aircraft has entered the circular flight path. It is noted that the tether is taut and the stoppable rotor has stopped.

The following figure illustrates an example of a process to use a stopped rotor aircraft to harvest wind energy.

Figure 3:
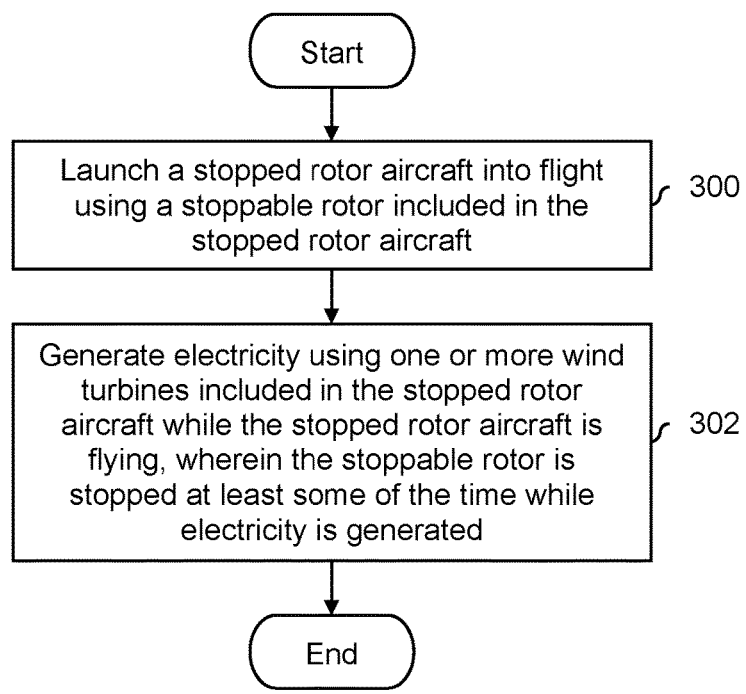
FIG. 3 is a flowchart illustrating an embodiment of a process to harvest wind energy using a stopped rotor aircraft.

FIG. 3 is a flowchart illustrating an embodiment of a process to harvest wind energy using a stopped rotor aircraft.

At 300, a stopped rotor aircraft is launched into flight using a stoppable rotor included in the stopped rotor aircraft. For example, the stopped rotor aircraft may take off vertically like a helicopter using the top-mounted stoppable rotor. In various embodiments, there is a tether which connects the stopped rotor aircraft to a ground station; the stoppable rotor includes a first blade and a second blade; when the stoppable rotor is stopped, the first blade is facing forward and the second blade is facing backward; the first blade is shorter than the second blade; the second blade includes a tailfin; and/or the first blade is narrower than the second blade.

At 302, electricity is generated using one or more wind turbines included in the stopped rotor aircraft while the stopped rotor aircraft is flying, wherein the stoppable rotor is stopped at least some of the time while electricity is generated. As will be described in more detail below, the stoppable rotor is stopped with one blade facing forward and the other blade facing backward in order to minimize drag. In various embodiments, the stoppable rotor also have a variety of features or characteristics (described below) to permit the stoppable rotor to remain in a stable (e.g., balanced) position while stopped.

The following figures describe some general embodiments of stopped rotor aircrafts which are not necessarily specialized for harvesting wind energy. Naturally, these stopped rotor aircraft embodiments may be modified for wind energy applications. In various embodiments, a stopped rotor aircraft may exhibit excellent forward motion performance and excellent hover performance. Other types of aircraft are good at one type of motion but not the other. In some embodiments, a stopped rotor aircraft is lightweight and uses a single rotor for hovering or ascending (descending) relatively straight up (down), which is more efficient than multiple, smaller rotors, resulting in good performance when hovering, ascending, or descending. In some embodiments, a stopped rotor aircraft is lightweight and has the body shape of a glider with very little drag, resulting in good performance when in forward flight.

In various embodiments, to further reduce drag when in forward flight, a stoppable rotor on top of the aircraft is turned off with one blade facing substantially forward and the other blade facing substantially backward. The stoppable rotor may have one or more other features to support starting and stopping mid-flight and to put the stoppable rotor into a desired position when stopped. These features are discussed in more detail below.

FIG. 4 is a diagram illustrating an embodiment of a stopped rotor aircraft with a foam filled skeg and wheels for various types of landing. This drawing and others described herein are not necessarily to scale.

In the example shown, diagram 400 shows a top view of the embodiment. In this example, the aircraft includes a stoppable rotor (402) which stops when the aircraft is moving forward and rotates when the aircraft is hovering. For this reason, rotor 402 is referred to as a stoppable rotor since it is configured to stop mid-flight.

In diagram 400, stoppable rotor 402 is shown almost at the desired or ideal stopped rotor position where the shorter blade (sometimes referred to herein as the leading blade) is facing forward and the longer blade (sometimes referred to herein as the trailing blade) is facing backwards as the aircraft moves forward. In this desired position, the stopped rotor offers the least drag as the aircraft moves forward.

As shown in this example, in some embodiments, the blades of the stopped rotor are slightly off from the desired or ideal stopped rotor position. For example, the drag may be within some acceptable range and it might not be worth trying to get the stopped rotor exactly into the ideal stopped rotor position.

More embodiments of a stoppable rotor are described below. In particular, features or characteristics (some of which are not shown in this figure) which assist in stopping the rotor mid-flight, provide stability when the rotor is stopped, and/or put the rotor when stopped at or near a desired stopped rotor position are described in more detail below.

In addition to the stoppable rotor on top of the aircraft, in the example shown in FIG. 1 the aircraft also includes two combination rotors (404) attached to the wings (406). The rotors 404 are referred to as combination rotors because they perform two functions. When the aircraft is hovering, combination rotors 404 act as counter-torque rotors which compensate for the torque induced by the stoppable rotor 402 (e.g., by rotating in a direction which counters the torque induced by the stoppable rotor). When flying forward with the lifting rotor stopped, rotors 404 act as forward thrust rotors which move the aircraft forward. In some other embodiments described below, an aircraft includes dedicated torque rotors (e.g., which are only on when the aircraft is hovering and are off when the aircraft is moving forwards).

Diagram 450 shows the side view of this embodiment. As shown here, the aircraft has a landing and hovering orientation of nose up, approximately 10°-15°. This nose up orientation can be retained while avoiding a tail first landing with use of a skeg (454) on the bottom of the aircraft. The nose up angle also permits the wings to have a better angle during transition both from hover to wingborne and wingborne to hover flight, by better aligning flow to the wing and better aligning the rotor for forward acceleration in level orientation. The nose up angle also permits more clearance between the rotor blades and the fuselage (body) of the aircraft.

In some embodiments the vehicle may be built as a single seat aircraft to fit within the ultralight weight restrictions. This may be possible given the relatively low mass of the stopped rotor hover system.

The skeg (454) which is located at the bottom of the aircraft may be foam filled or built as a crush structure. In the event of an emergency landing, the foam-filled skeg can act as a cushion, absorbing some of the impact. The skeg also permits non-emergency landings on a variety of surfaces. For example, the fin-like shape of the skeg permits the skeg to pierce water more easily for a water landing. Wheels (456) could also be used to permit a horizontal landing on a solid surface.

The following is high level description of how the aircraft operations in various modes or states of operation. Some features or aspects of the aircraft's operation in these modes may be described in more detail in subsequent figures.

Takeoff

The aircraft performs a vertical takeoff using stoppable rotor 402 to achieve enough lift to take off. Combination rotors 404 will also be on to counter the torque induced by stoppable rotor 402. Naturally, the speed of the stoppable rotor may be adjusted to hover, rise vertically, or descend vertically. The flaps on the rotor may also be used in order to generate high frequency content thrust and cyclic control signal, while the rotor RPM can be adjusted to get low frequency control over hover thrust.

It is also possible for the vehicle to takeoff and land conventionally if fitted with landing gear.

Hover

When hovering, the stoppable rotor (402) is on. Since the stoppable rotor will induce a torque on the aircraft, combination rotors 404 are also on in a direction which counters the torque produced by stoppable rotor 402. In other embodiments, rotors or other structures other than rotors 404 may be used to counter the torque produced by a stoppable rotor such as stoppable rotor 402.

Transition from Hover to Forward Flight

To transition from hovering to forward flight, the stoppable rotor (402) is used to carry the vehicle into forward flight at a flight speed above the stall speed of the aircraft under wing lift along. After this the collective on the rotor is adjusted to give low lift and the rotor is quickly stopped after the majority if lift is transitioned to the wing. Once stopped, in various embodiments, the rotor is substantially in the desired or optimal position with the shorter blade facing forward and the longer blade facing backwards. See, for example, diagram 450. Some processes for stopping the rotor and features or characteristics of the blade(s) which assist with stopping and/or providing stability when stopped are described in more detail below. The rotor stopping sequence becomes unstable at high advance ratios. To avoid the blade diverging from a relatively flat plane, active control can be applied with the flaps on the rotor. This could include, for example, feeding back the teeter axis angular rate on the rotor so as to provide teeter axis damping.

As for the combination rotors (404), those rotor switch from countering the torque of the stoppable rotor to providing forward motion. In some embodiments, this means switching directions of rotation (e.g., counterclockwise to clockwise or vice versa). Naturally, the speed of the combination rotors may be adjusted to move forward faster or slower as desired once in forward flight. One embodiment of the combination rotors has the rotor which switches directions provide a smaller amount of thrust. If the thrust is set lower, the inefficiency of spinning backwards will be countered approximately by the efficiency gain of a low disc loading, and the efficiency of this rotor may be matched to that of the forward spinning motors providing antitorque.

Transition from Forward Flight to Hover

To transition from forward flight to hover, the combination rotors (404) are switched (if needed) from a direction which provides forward motion to a direction which counters the torque from the stoppable rotor (402). The stoppable rotor is also started.

Landing

As shown in this example, a variety of landings are supported. In some embodiments, the aircraft lands vertically by gradually decreasing the speed of the stoppable rotor when hovering. Or, the aircraft may land horizontally on land or on water using the wheels or foam filled skeg while in forward flight mode.

Some other aircraft designs may have many rotors for hovering, where the blades are relatively small compared to the exemplary blades shown here. Using a single rotor when hovering (as shown in this embodiments) has number of benefits compared to other designs with multiple rotors for hovering. For one thing, a single rotor produces less noise (e.g., as measured by decibels) and the noise produced is at a lower frequency. In contrast, an aircraft which hovers using multiple rotors with smaller blades will produce more (i.e., louder) noise at a higher (e.g., "buzzing") frequency. To people in the vicinity, the latter is more annoying and so designs with a single rotor for hovering may be preferable to ones with many rotors with smaller blades for hovering.

Another benefit to using a single rotor to hover is that the corresponding motor is consumes less power than all of the motors combined (i.e., to rotate multiple rotors with smaller blades), if the disc area of the single rotor is larger than that of the combination of all smaller rotors in the comparison. This benefit can be increased through the greater Reynolds number of the single rotor, although some efficiency may be lost due to the in-blade flap mechanism. In some embodiments, the stopped rotor aircraft is battery-powered, so consuming less power is desirable since it extends the flight range and/or flight time.

In some embodiments, a stopped rotor aircraft can be configured for easier transport. For example, the wings of a stopped rotor aircraft may be removable from the body. Once separated, the wings and body may then be placed in some trailer (e.g., enclosed or open-air) and towed. Alternately, the wing may be mounted on a swivel such that it can be rotated without any connections being severed, so as to better fit on a trailer. This permits the stopped rotor aircraft to be more easily towed due to the smaller width once the wings and body are separated. In some embodiments, the wings rotate (e.g., on some hinge) so that the wings run parallel to the body of the aircraft to achieve a narrower width for easier transport.

The following figure illustrates another example of a stopped rotor aircraft.

Figure 5A:
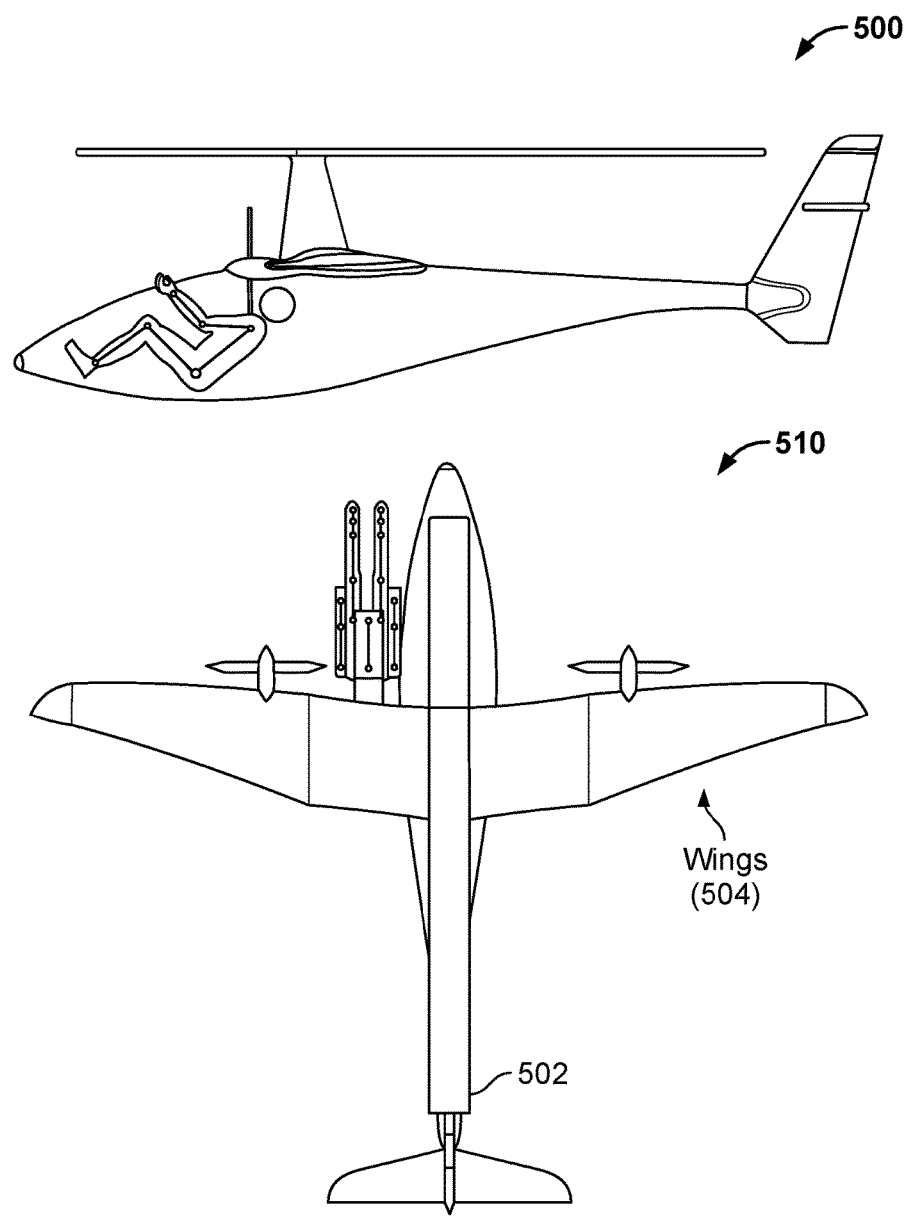
FIG. 5A is a diagram illustrating a side view and top view of a second embodiment of a stopped rotor aircraft.
Figure 5B:
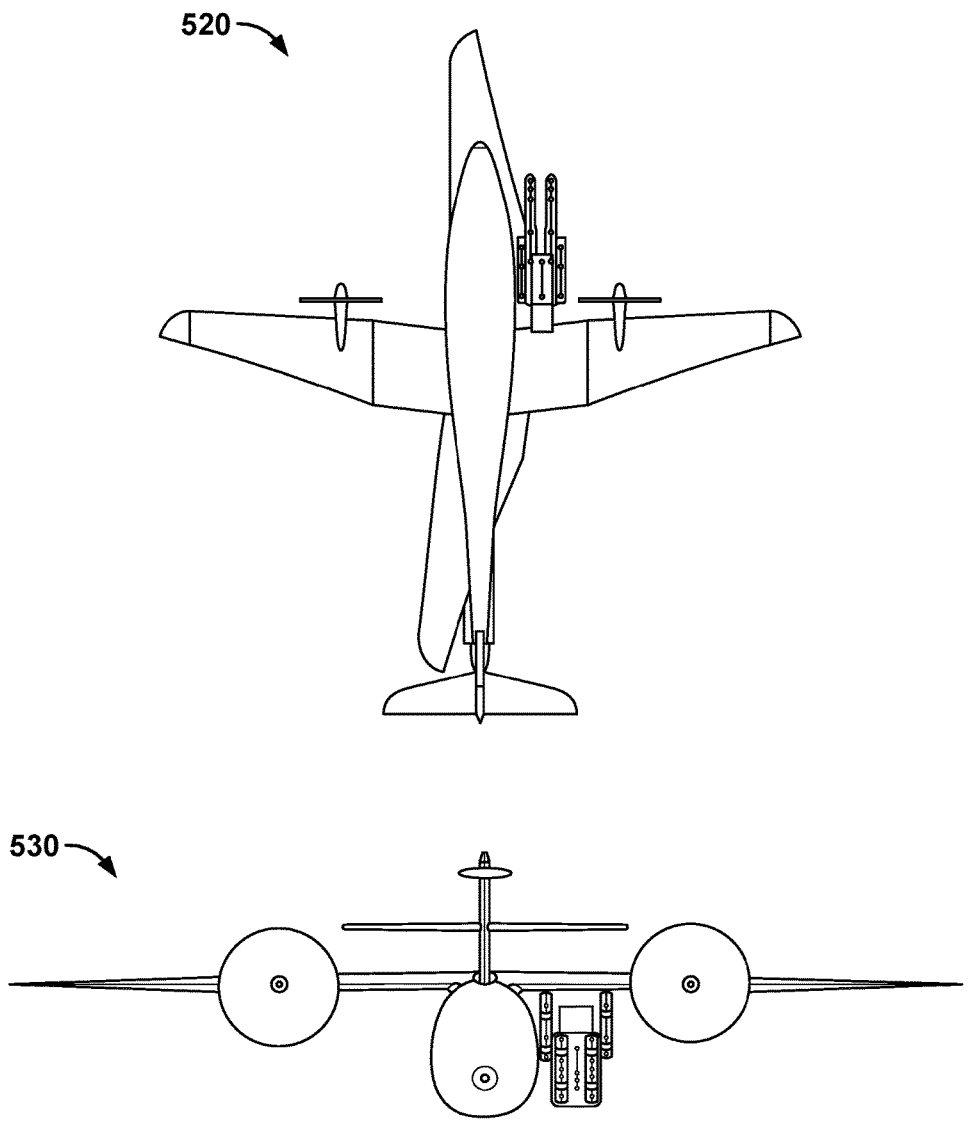
FIG. 5B is a diagram illustrating a bottom view and a front view of a second embodiment of a stopped rotor aircraft.

FIGS. 5A and 5B are diagrams illustrating a second embodiment of a stopped rotor aircraft. In the example shown, diagram 500 shows a side view, diagram 510 shows a top view, diagram 520 shows a bottom view (with the wings rotated to show relative length with respect to the nose-to-tail length), and diagram 530 shows a front view. Stoppable rotor 502 is not shown in detail in this figure and the lack of features (e.g., no flaps, no shaping, etc.) shown herein should not be held as limiting. More detailed embodiments of a stoppable rotor are described in more detail below. It is also noted that the pilot is shown outside of the aircraft in diagrams 510, 520, and 530 for sizing context.

In this example, the wings (504) have a more aerodynamic shape compared to the embodiment shown in FIG. 4. This figure also offers some views (e.g., diagram 520 and diagram 530) not shown in FIG. 4.

The following figure illustrates another example of a stopped rotor aircraft, this time with dedicated counter-torque rotors.

Figure 6:
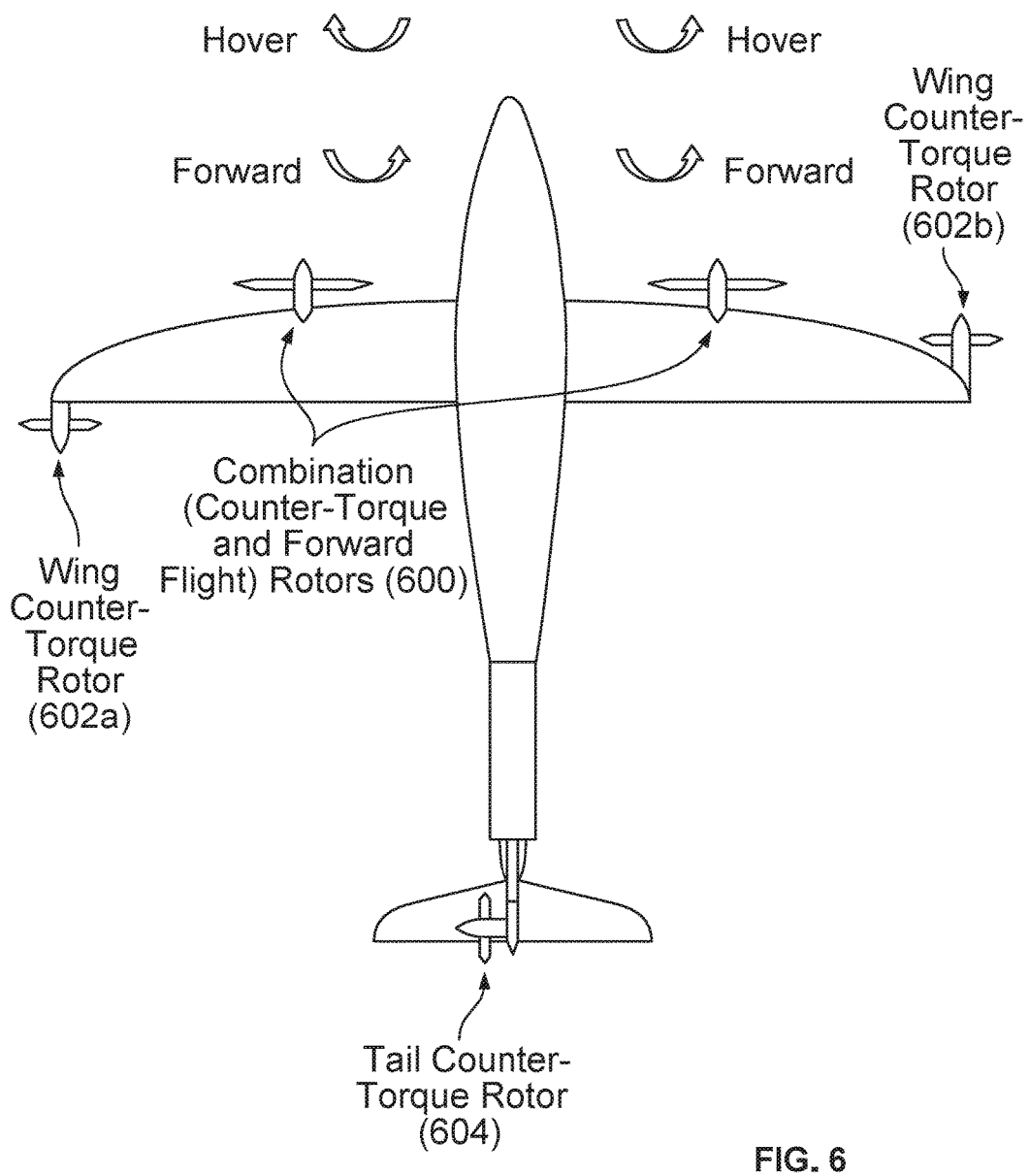
FIG. 6 is a diagram illustrating an embodiment of a stopped rotor aircraft with dedicated counter-torque rotors.

FIG. 6 is a diagram illustrating an embodiment of a stopped rotor aircraft with dedicated counter-torque rotors. In this example, a different number and arrangement of rotors for forward flight and/or detorquing is shown compared to the previous examples. For clarity, the stoppable rotor on top of the aircraft is not shown in this figure.

In this example, the aircraft has rotors which are dedicated counter-torque rotors. Two such rotors are mounted on the wings (wing counter-torque rotors 602a and 602b) and one is on the tail (tail counter-torque rotor 604). Since these are dedicated counter-torque rotors, these rotors only rotate during hover when the stoppable rotor (not shown) is rotating. During forward flight (when the stoppable rotor is stopped), counter-torque rotors 602a, 602b, and 604 do not rotate.

In contrast, combination rotors 600 operate during hover as well as forward flight. This figure illustrates the directions in which combination rotors 600 rotate. When hovering, they rotate in opposite directions and during forward flight they rotate in the same direction. Rotors 600, 602a, and 602b are sometimes referred to as wing-mounted rotors because they are mounted to the wings of the aircraft.

As shown herein, any number and/or arrangement of forward flight and/or torque rotors may be used.

Figure 7:
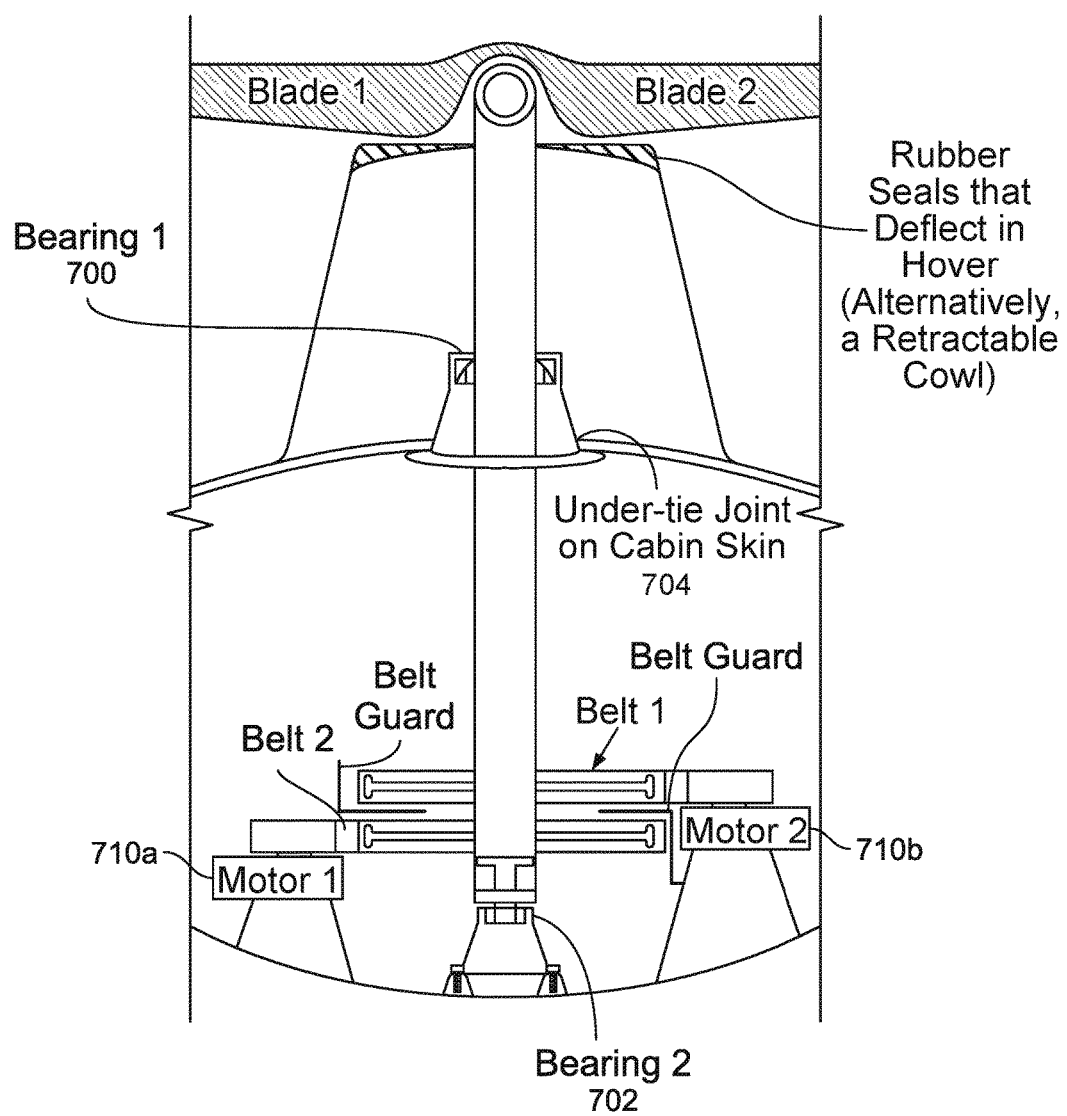
FIG. 7 is a diagram illustrating an embodiment of mechanical components which connect the stoppable rotor to the rest of the aircraft.

FIG. 7 is a diagram illustrating an embodiment of mechanical components which connect the stoppable rotor to the rest of the aircraft. In the example shown, the upper bearing (700) provides a cupola type support for the break in the skin while the upper bearing can be a spherical plain type for lower mass and lower tolerance. In the example shown, bearing 1 (700) is plain, having a surface speed of approximately 1 m/s. However, similar designs may be made and in particular, if the driveshaft is made of steel, roller bearings can be used with a minimum of weight.

Because of the lightweight nature of the stoppable rotor, in various embodiments, the rotor inertia is extremely low. As such, in the event of a power outage there may be very little time for the pilot to react and start autorotation. There also may be very little time to flare. To address this, in the example shown in FIG. 4 the lift thrust is split into two motors (710a and 710b), each of which is capable of either hover or a slow descent where the two motors are fully independent. An alternate embodiment is to split the motor into more than three windings. For example, a six winding motor with two independent motor controllers would provide redundancy for a majority of failure cases. Because of the small amount of power used in hover, it is reasonable to put a separate battery on each (not shown here) and to allow it to charge at a slow rate of descent. For example, for a desired T/W≈1.2 at maximum takeoff weight, we should expect a torque limited drive system to deliver about 75% of hover thrust, with the rest needing to come from autorotation for forward flight. Given that many electric motors are capable of momentary overloads, we can probably plan a flight path on landing that doesn't require hover thrust for a significant time or outside of ground effect, and pay very little penalty in mass for the complete redundancy. If a lift fan motor is already out while in forward flight, the pilot should probably perform a horizontal landing on a runway if at all possible.

Typical rotors are not designed to stop mid-flight. For example, the rotors of a helicopter do not stop until the helicopter lands. The following figures illustrate more detailed examples of a rotor which is designed to stop mid-flight and which may be used by a stopped rotor aircraft.

Although not necessarily shown herein, in some embodiments, a variety of techniques and/or components may be used to slow down the stoppable rotor, stop the stoppable rotor in some desired position, and/or keep the stoppable rotor in the (e.g., desired) stopped position once stopped. For example, in some embodiments, brakes are used to slow down the stoppable rotor. In some embodiments, the motor is used to stop the rotor. In some embodiments, if the stoppable rotor stops in some position where the leading (trailing) blade is not facing sufficiently forward (backward), the motor is turned on again (e.g., very slowly and/or at low power) to nudge the blades forward until they reach the desired stopped position. In some embodiments, once stopped, the stoppable rotor is kept in place with a clamp or lock. These techniques and components are merely exemplary and are not intended to be limiting.

In some embodiments, the underside of one of the blades has a reflective patch or some other variety of zero crossing indicator. In some embodiments, this reflective patch is used to detect when the blades are in some desired stopped position or to calibrate a blade phase estimation (e.g., with the leading blade facing forward and the trailing blade facing backward). A stationary light, shining upwards, is positioned to hit the reflective patch when the stoppable rotor is in the desired stopped position. By detecting the reflection from the patch, it is possible to detect when the stoppable rotor has stopped in the desired stopped position. In some embodiments, when the stoppable rotor is moving (e.g., during hover mode), the reflective patch is used as a tachometer. In an alternate embodiment, the rotor shaft may have an encoder that would be used to detect blade angle and control the blade to a desired stopping location over a pre-planned torque, speed, or position profile. In another alternate embodiment, a desired torque profile is used as a basis for stopping motion control, and a feedback loop is closed over this to force the rotor to stop at a desired rotation angle.

Figure 8:
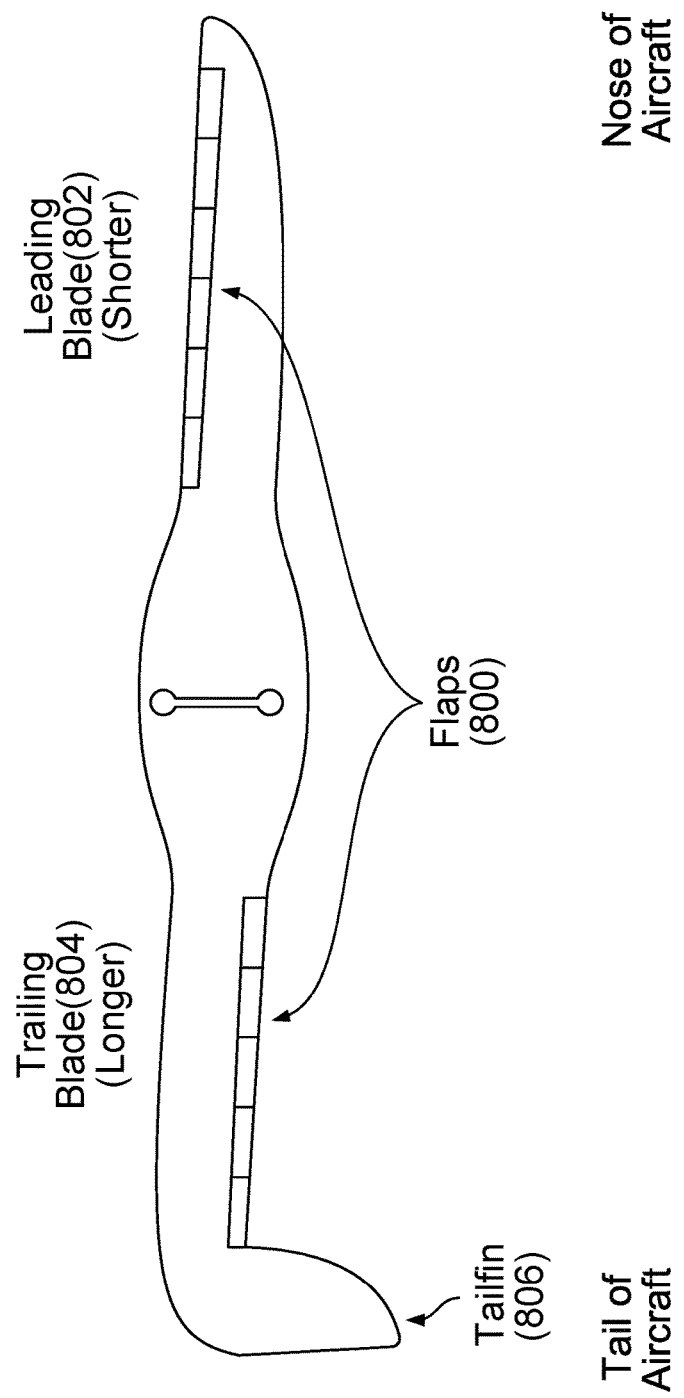
FIG. 8 is a diagram illustrating an embodiment of a stoppable rotor with flaps.

FIG. 8 is a diagram illustrating an embodiment of a stoppable rotor with flaps. In this example, to make starting and stopping the rotor mid-flight easier, the blades (802 and 804) and other parts of the stoppable rotor are relatively low-inertia (i.e., lightweight). This makes the blades easier to start and stop. Lighter blades not only reduce total vehicle weight, they also allow for RPM control of thrust and reduce the need for collective control range on the flaps.

In various embodiments, the rotor blade is asymmetric to make the rotor more stable when stopped during forward flight (drawing in FIG. 8 is not to scale). That is, one blade of the exemplary stoppable rotor shown here is longer than the other blade. More specifically, the leading blade (i.e., the forward-facing blade when the rotor is stopped) is shorter than the trailing blade (i.e., the backward-facing blade when the rotor is stopped). With the blades stopped (where the blades are relatively lightweight for the reasons described above) and the aircraft moving forward, the forward-facing blade could tip upwards and the backward-facing blade could tip downwards from the air resistance when moving forward. If the blades were of equal length, then this is more likely to occur. By making the forward-facing blade shorter than the backward-facing blade, the blades are more stable about the teeter axis during forward flight when stopped.

In some embodiments, not shown in FIG. 8, the rotor has only one blade, specifically the trailing blade, which is balanced by a counter-weight instead of a leading blade during hovering and transitioning flight In the example shown in FIG. 8, the flaps (800) are used to control or otherwise adjust the blades of the stoppable rotor, for example when in hover mode. In this particular example, both the trailing blade (804) and the leading blade (802) have flaps. Alternatively, in some embodiments, only one of the blades have flaps or no flaps are used (e.g., the rotor is stopped using the motor). When a collective, cyclic, blade pitch or other command is given that would change rotor output force or moments, the flaps are used as a primary flight control to enact the change in output force and/or moment. For example, a cyclic command would become a sinusoidal command on the flaps. Each flap can (if desired) be commanded independently to an optimal angle to maximize rotor efficiency over the set of commands, or they can be commanded in some simplistic mixed control manner such as duplication of the same command to every servo on a blade. When stopping the stoppable rotor (i.e., when transitioning from hovering to forward flight), the flaps may be used to control blade pitch and minimize the instability of the rotor blade at the transient high advance ratios seen during the stopping procedure. When the stoppable rotor has stopped, the flaps may be returned to a neutral position to minimize drag during forward flight and to minimize energy used.

The tailfin (806) of the trailing blade causes the stoppable rotor to retain a level pitch or teeter attitude when the aircraft is in a forward mode of flight, while the motor and/or brake which controls the azimuth angle of the rotor such that the trailing blade is substantially in the downwind direction of flow from the center of rotor rotation. Specifically, the tailfin shape causes the stoppable rotor (when stopped during forward flight) to remain in a substantially level position where the leading blade (802) does not unduly tilt up (down) and the trailing blade (804) does not unduly tilt down (up). If that happened, the drag would not be insignificant and forward flight performance would suffer. Tailfin 806 helps the stoppable rotor stop at (or at least near) some desired or ideal position when stopped. This is because if the trailing blade (when at a stop and facing backwards) were to tip downward, the tailfin would exert a greater righting moment than the leading blade would exert an anti-righting moment. The greater upward force on the tail plane causes the rotor to return to a neutral angle and results in static stability. The long moment arm from the teeter pivot location to the tailfin results in a large pitch rate damping term which is helpful for producing dynamic stability, but does not guarantee dynamic stability for all possible designs. This behavior correction causes the stoppable rotor to remain substantially stable and in the level plane when stopped during forward flight.

The following figure illustrates another embodiment of a stoppable rotor, this time with a different tailfin shape.

Figure 9:
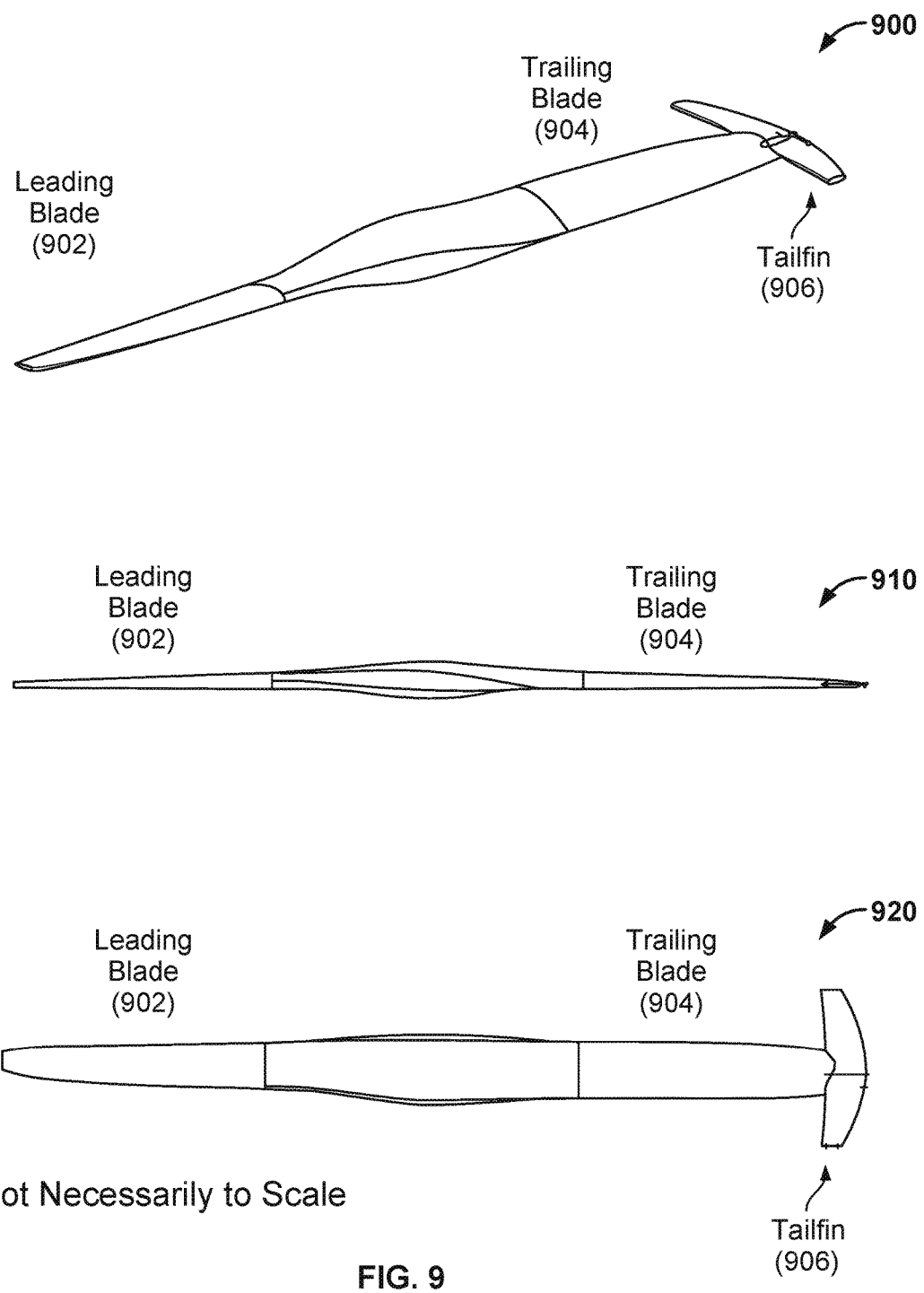
FIG. 9 is a diagram illustrating an embodiment of a stoppable rotor with a two-headed tailfin shape.

FIG. 9 is a diagram illustrating an embodiment of a stoppable rotor with a two-headed tailfin shape. In this figure, diagram 900 shows an angled view, diagram 920 shows a side view, and diagram 920 shows a top view. In this particular example, the tailfin (906) has two protrusions (e.g., whereas tailfin 806 in FIG. 8 only has a single protrusion). As is shown in this example, tailfins (and, more generally, stoppable rotors) encompass a variety of embodiments. It is noted that the figure is not necessarily to scale and the leading blade (902) and trailing blade (904) are not necessarily the same length even though they may appear to be so in this drawing.

In some embodiments, a stoppable rotor does not include a tailfin. For example, the trailing blade may be made wider than the leading blade. This may cause similar corrective forces which would cause the trailing blade (e.g., when stopped and facing backwards during forward flight) to be pushed back down when tilted up and to be pushed back up when tilted down. Naturally, asymmetric blade widths may be a design feature used even when there is a tailfin.

The following figure illustrates an embodiment of the internal electrical components of the stoppable rotor. In this example, the internal components correspond to a stoppable rotor embodiment similar to that shown in FIG. 8 (i.e., where both blades have flaps).

Figure 10:
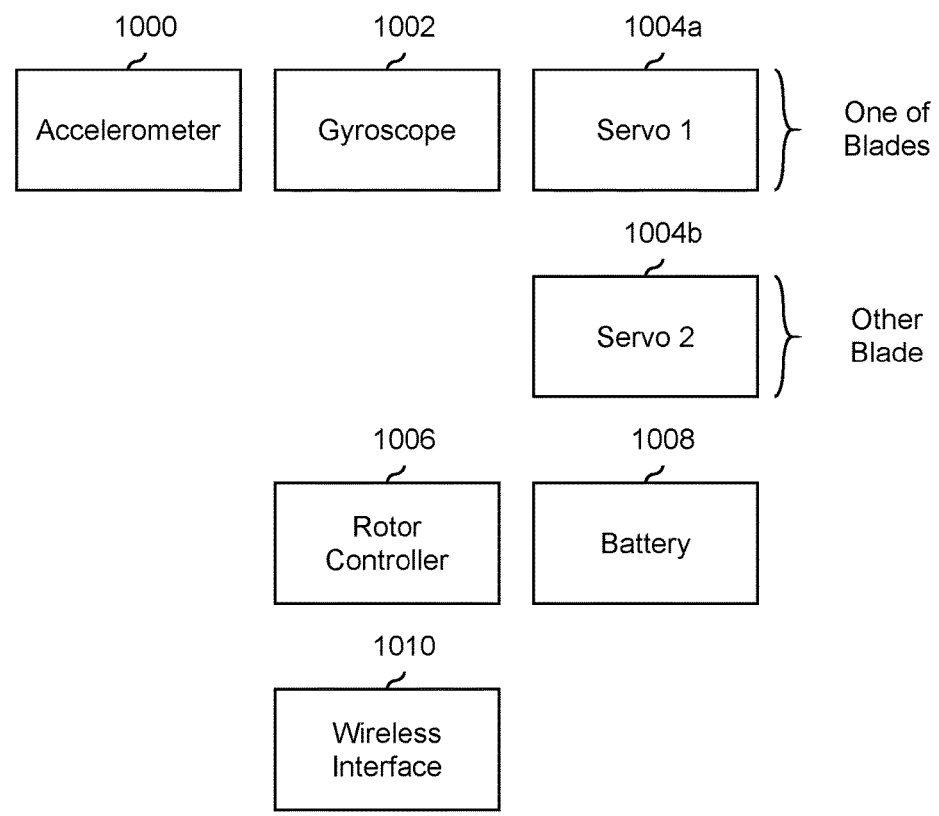
FIG. 10 is a diagram illustrating an embodiment of internal electrical components in a stoppable rotor.

FIG. 10 is a diagram illustrating an embodiment of internal electrical components in a stoppable rotor. In the example shown, the placement of components in the figure does not reflect the actual placement of components within the stoppable rotor. For example, the accelerometer (1000), gyroscope (1002), and servo (1004) may be located in a either the leading blade of a stoppable rotor or the trailing blade even though they are not necessarily shown here as such.

The accelerometer (1000) and gyroscope (1002) are used to measure orientation and acceleration. The servos (1004a and 1004b) are used to position the flaps in their respective blade (e.g., raising or lowering the flaps to slow down the stoppable rotor and in a neutral position when the stoppable rotor is rotating). It is noted that although in this example both blades have flaps, some other embodiments may be configured differently.

Generally speaking, rotor controller 1006 acts as the controller for the other components shown here. Instructions (e.g., issued by the pilot and/or flight computer) are passed from wireless interface 1010 to rotor controller 1006 which parses the instruction to determine which component the instruction is directed to. The instruction is then passed to the appropriate component. If there is any return data (e.g., an orientation reading from one of the accelerometers, or an acceleration reading from one of the gyroscopes), then that data is passed from the relevant component to rotor controller 1006 to wireless interface 1010 and back to the pilot and/or flight computer over the wireless channel.

During flight, in the embodiment shown, all of the components shown are sealed off in the stoppable rotor. As such, there are no wires into the exemplary stoppable rotor to supply power and power is supplied by battery 1008. In various embodiments, battery 1008 may be recharged in a variety of ways. In some embodiments, stoppable rotor can be opened up, exposing battery 1008 and permitting battery 1008 to be charged and/or replaced with a charged battery. For example, the stoppable rotor may have some screws which keep some panel (e.g., covering the battery) closed. In applications where the battery life is relatively long and/or a tight(er) seal is desired, this may be attractive. Alternatively, the stoppable rotor may have some battery charging port or other opening (e.g., protected by some rubber plug during flight) into which a charger is inserted when the stoppable rotor is not in use. This may be attractive in applications where the battery needs to be recharged relatively frequently and/or opening up the stoppable rotor is inconvenient. Alternately, some stopped rotor systems may have a slip ring which is used to carry power and/or signal onto the blade, or in which a pneumatic control signal is used to achieve a given control and no electronics live on the blade. These embodiments may be desirable in environments with high electromagnetic noise and/or on vehicles where the rotor will be used at a high duty cycle and recharging of the blade is deemed too onerous for operations.

Since all of the components shown in this example are sealed off during flight, wires are not used to communicate with the components shown. Rather, wireless interface (1010) is used to communicate with (as an example) a flight computer and/or some pilot. For example, suppose that the aircraft is manned by a pilot. The cabin will have a counterpart wireless interface (not shown) which sends the pilot's instructions from the cabin (e.g., possibly via a flight computer) to wireless interface 1010 and from there on to rotor controller 1006 and any other relevant components (e.g., if it is an instruction to move or otherwise position the flaps, then rotor controller 1006 will communicate with the appropriate servo(s)).

Some example wireless technologies which may be employed (depending upon the application, as described above) include a variety of regulated and unregulated wireless communication technologies, including (but not limited to) infrared, radio, etc.

In some embodiments, wireless interface 1010 includes security features to protect the stopped rotor aircraft from being commandeered by some other pilot and/or flight computer either inadvertently or intentionally. For example, the two wireless interfaces may use encryption (such as public key encryption) to communicate. With public key encryption, neither side can be "spoofed" by another device, even over a wireless communication channel where all transmissions are observable. Alternately, the level of signal and the minimum threshold of receiving, or a narrow receiving angle mode of communication could be used. For example, a well shaded laser point to point interface or a capacitatively coupled set of coils may be used. Alternately, communications may occur over either an electrical or optical slip ring.

During normal operation (e.g., when wireless communication with the pilot and/or flight computer is available), rotor controller 1006 may follow the instructions of the pilot and/or flight controller. In this example, the pilot and/or flight controller can specify any of the following instructions to rotor controller 1006 (e.g., via wireless interface 1010) and rotor controller 1006 will pass on the instruction to the appropriate component and adjust that component as needed (e.g., to achieve the desired value specified by the pilot and/or flight controller):

Position of flap 1 (2) using servo 1 (2) (e.g., specified as an angle, such as −90° through) 90°

Measure acceleration in using the accelerometer

Measure orientation in using the gyroscope

Other instructions or controls (e.g., controlling the rotational speed of the stoppable rotor, controlling the angle/tilt of the stoppable rotor, etc.) may be controlled externally by components outside of the stoppable rotor and as such as not passed wirelessly to the stoppable rotor (see, e.g., FIG. 7).

In some embodiments, if the wireless connection is lost, the rotor controller goes through some sequence of emergency procedures. To detect when the wireless connection goes down, wireless interface 1010 tracks the last time a transmission was received from the counterpart wireless interface via which communications are exchanged with the pilot and/or flight controller (e.g., in the cabin or on the ground). To ensure that transmissions occur at some minimum frequency (e.g., in case there is some quiet period where neither side needs to exchange information), both wireless interfaces send beacons or pings at some predefined or otherwise specified frequency. If the amount of time since that last transmission was received exceeds some threshold, rotor controller 1006 will assume it has lost communication with the pilot and/or flight controller.

In one example, since wireless communication has range limitations and because uncontrolled forward flight may cause the aircraft to run into something, when the rotor controller determines that communication has been lost, the rotor controller configures the stoppable rotor for hovering. By putting the stoppable rotor into a hovering configuration, it is hoped that the aircraft will not go out of range of the other wireless interface and/or the aircraft will not collide with something.

It is noted that since the motor(s) which control the rotation of the stoppable rotor are outside of the stoppable rotor (see, e.g., FIG. 4), the rotor controller cannot start the motors which drive the stoppable rotor (if needed) when in a lost communication state. In some embodiments, wireless interface 1010 emits a wireless signal indicating that the stoppable rotor is in a lost communication state (e.g., just in case it is merely the receive capability of wireless interface 1010 which is not working, or wireless interface 1010 is less sensitive than the counterpart wireless interface). In some embodiments, the stoppable rotor issues some external, visual signal. For example, the rotor controller may turn on an external light, indicating that the stoppable rotor is in a lost communication state (e.g., a first color for normal operation, a second color for the lost communication state, and a third color for an emergency state). Such indications may enable a pilot and/or a flight computer to know that the stoppable rotor is in a lost communication state and is switching (if needed) to hovering. This may signal to the pilot and/or flight computer to take appropriate action (e.g., turn on the motors which drive the stoppable rotor).

The following figures illustrate some processes associated with slowing down a stoppable rotor to a stop. First, a process for gradually stopping the stoppable rotor is described. Then, since the stoppable rotor can become unstable as it slows down to a stop, a process for detecting such an instability and correcting for it is described.

Figure 11:
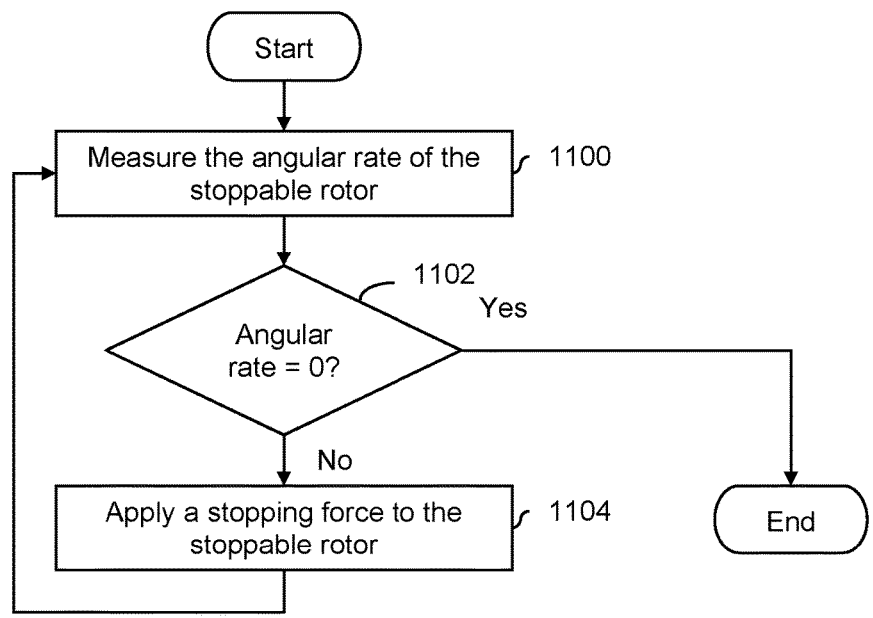
FIG. 11 is a flowchart illustrating an embodiment of process to stop a stoppable rotor using angular rate.

FIG. 11 is a flowchart illustrating an embodiment of process to stop a stoppable rotor using angular rate. In the example shown, the process is performed when the aircraft is transitioning from hovering to forward flight and the stoppable rotor needs to be stopped.

At 1100, the angular rate of the stoppable rotor is measured. For example, as described in FIG. 10, a gyroscope may be used to measure angular rate with corrections based on a zero crossing sensor.

At 1102, it is determined if the angular rate equals zero. In other words, has the stoppable rotor stopped rotating? If the angular rate is determined to be non-zero at 1102, a stopping force is applied to the stoppable rotor at 1104. As described above, a variety of techniques may be used to stop the stoppable rotor (e.g., brakes, rotor shaft with encoder, a desired torque profile). In some embodiments, the degree or amount of stopping force (torque) varies at 1104 (e.g., depending upon a feedback loop). The angular rate is then measured again at step 1100.

If it is determined at 1102 that the angular rate is zero, then the process ends at 1106. In various embodiments, a variety of things can occur when the stoppable rotor stops (e.g., some lock or clamp locks the stopped rotor into place).

In some cases, the stoppable rotor may enter an undesirable and/or unstable position or state when it is slowing down to a stop. The following illustrates an example of such an undesirable position.

Figure 12:
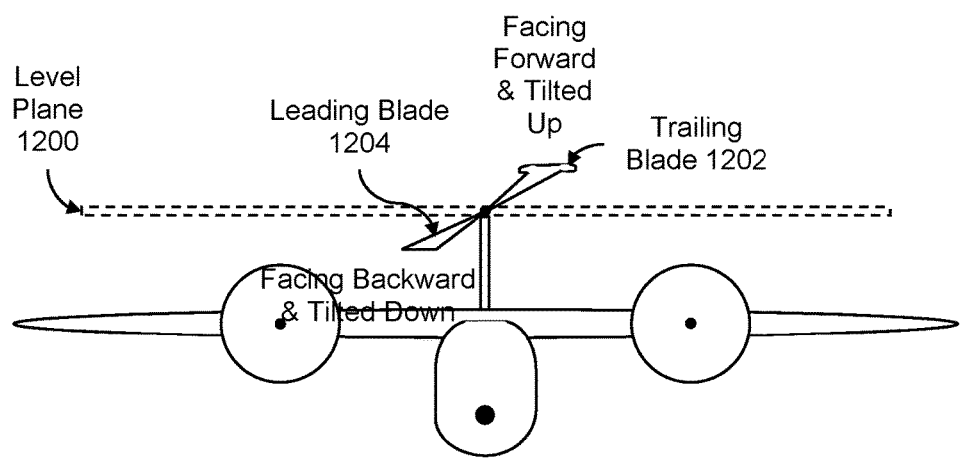
FIG. 12 is a diagram illustrating an embodiment of an undesirable position which may occur when a stoppable rotor is coming to a stop.

FIG. 12 is a diagram illustrating an embodiment of an undesirable position which may occur when a stoppable rotor is coming to a stop. In the example shown, plane 1200 shows a level plane in which the stoppable rotor ideally or preferably rotates and stops. This is the preferred plane because it is a neutral plane and is the most stable. For clarity, some elements of the aircraft are not shown (e.g., a tail).

Sometimes when the rotor is slowing down, as the trailing blade (1202) comes around to the front of the aircraft, the trailing blade may catch in the wind or air, causing the trailing blade to stop while pointing (substantially) forward and the leading blade (1204) to stop while pointing (substantially) backward. When stopped, the blades should be pointing in the opposite directions, (i.e., leading blade 1204 should be facing forward and trailing blade 1202 should be facing backward). Also, in this stopped position, the trailing blade will be tilted up (i.e., above level plane 1200) and leading blade 1204 will be tilted down (i.e., below level plane 1200). When stopped, the blades should substantially be in level plane 1200 because this minimizes the drag from the stopped blades when the aircraft is moving forward. In some embodiments, the rotor controller detects the position shown in this figure from the gyroscope(s) in the blade(s) and/or a reflective patch under one of the blades. In some such embodiments, a stopped rotor aircraft performs the following process when it detects that the rotor blades have left the level plane when slowing down to a stop and/or that the blades are coming to a stop pointing or otherwise facing in the wrong direction.

Figure 13:
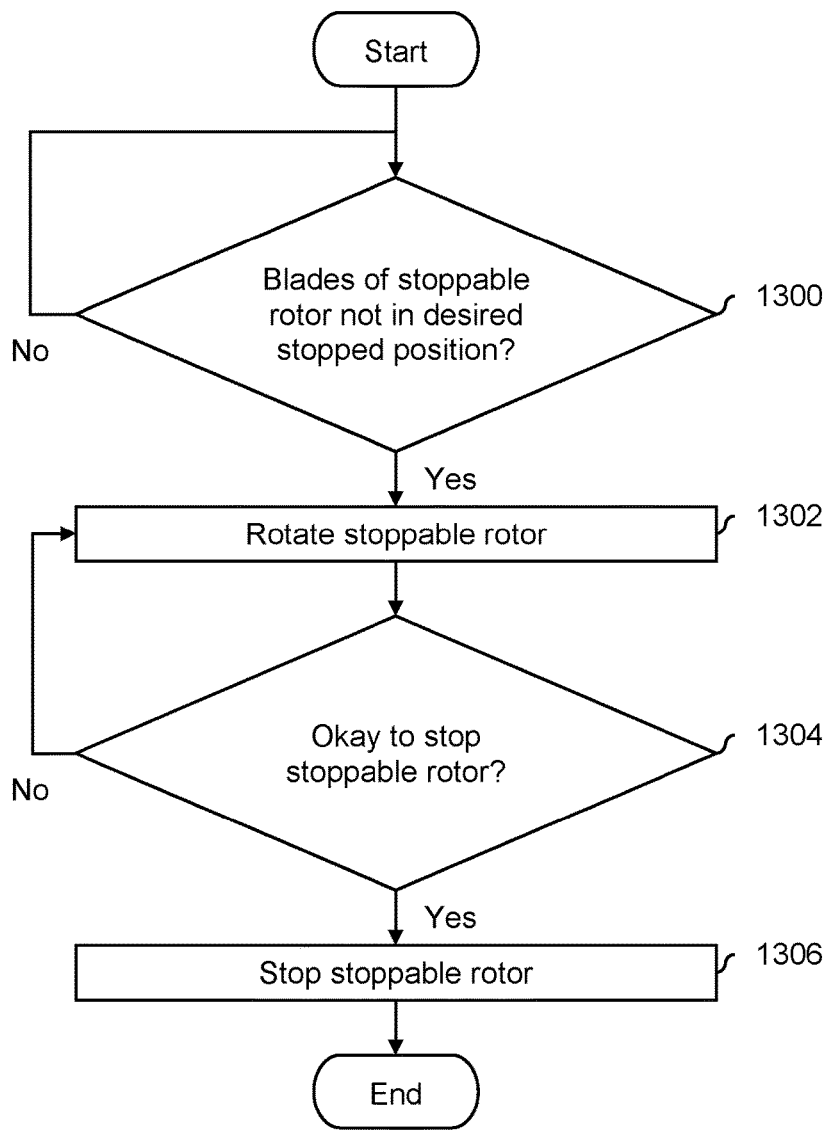
FIG. 13 is a flowchart illustrating an embodiment of a process to restart a stoppable rotor in the event the blades of the stoppable rotor enter an undesirable position as the stoppable rotor comes to a halt.

FIG. 13 is a flowchart illustrating an embodiment of a process to restart a stoppable rotor in the event the blades of the stoppable rotor enter an undesirable position as the stoppable rotor comes to a halt. In the example shown, the process is performed when a stoppable rotor is slowing down to a stop (e.g., when the aircraft is transitioning from hovering to forward flight).

At 1300, it is decided if the blades of the stoppable rotor are detected to not be in a desired stopped position. See, for example, FIG. 12. Step 1300 may be performed by the gyroscope(s) in the blade(s) and/or using a reflective patch under one of the blades which helps to detect when that blade is properly stopped and is properly facing forward or backward. In some embodiments, the blades need to be out of the desired stopped position by some predefined angle or amount (e.g., so that a small, acceptable amount of tilting up/down or shifting left/right by the blades does not cause a correction).

If the blades are detected to be in the desired stopped position at 1300, then the process will continue to monitor the blades at step 1300. Otherwise, the stoppable rotor is rotated at 1302. For example, if the motor(s) which power the stoppable rotor was/were turned off to allow the stoppable rotor to come to a complete stop, then the motor(s) may be turned back on (see, e.g., motors 710*a* and 710*b* in FIG. 7).

At 1304, it is decided if it is okay to stop the stoppable rotor. For example, the motor(s) for the stoppable rotor may be kept on until the blades are detected to be in the level plane. That is, the system checks for some condition to be met before trying to stop the stoppable rotor again. In some embodiments, the motor(s) to the stoppable rotor may be run for a fixed amount of time. If it is decided that it is okay to stop the stoppable rotor, the stoppable rotor is stopped at 1306. For example, the motor to the stoppable rotor may be turned off.

Otherwise, at 1304, the stoppable rotor keeps rotating at step 1302. In some embodiments, the aircraft gradually steps up the angular or motor speed (as needed) in order to get the blades into the level plane. For example, a small tilt up/down may not require that much angular speed to return the blades to the level plane, and it may be desirable to keep the angular speed low so that the rotor can be stopped sooner.

In some embodiments, the process of FIG. 13 is performed in parallel with the process of FIG. 11. For example, the process of FIG. 11 may be used to slow down the stoppable rotor, but the process of FIG. 13 may be used to start up the rotor again if the blades are detected to leave the level plane and/or stop with the blades facing the wrong direction.

In the context of FIG. 10, rotor controller 1006 may automatically perform the process of FIG. 13 when a stop rotor or deploy flaps instruction is received from a pilot and/or flight computer. If rotor controller 1006 detects that the blades of the stoppable rotor have left the level plane, the rotor controller 1006 may communicate with the pilot and/or a flight computer so that the motor(s) which power(s) the stoppable rotor can be started (at least temporarily). In some embodiments, the motor(s) give(s) a brief "pulse" to the stoppable rotor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a stoppable rotor which is configured to launch a stopped rotor aircraft into flight; and
one or more wind turbines which are configured to generate electricity while the stopped rotor aircraft is flying, wherein the stoppable rotor is stopped at least some of the time while electricity is generated.

2. The system recited in claim 1, further comprising a ground station and a tether which connects the stopped rotor aircraft to the ground station.

3. The system recited in claim 1, wherein:
the stoppable rotor includes a first blade and a second blade; and
when the stoppable rotor is stopped, the first blade is facing forward and the second blade is facing backward.

4. The system recited in claim 1, wherein:
the stoppable rotor includes a first blade and a second blade;
when the stoppable rotor is stopped, the first blade is facing forward and the second blade is facing backward; and
the first blade is shorter than the second blade.

5. The system recited in claim 1, wherein:
the stoppable rotor includes a first blade and a second blade;
when the stoppable rotor is stopped, the first blade is facing forward and the second blade is facing backward; and
the second blade includes a tailfin.

6. The system recited in claim 1, wherein:
the stoppable rotor includes a first blade and a second blade;

when the stoppable rotor is stopped, the first blade is facing forward and the second blade is facing backward; and the first blade is narrower than the second blade.

7. A method, comprising:

launching a stopped rotor aircraft into flight using a stoppable rotor; and generating electricity using one or more wind turbines while the stopped rotor aircraft is flying, wherein the stoppable rotor is stopped at least some of the time while electricity is generated.

8. The method recited in claim 7, wherein there is a tether which connects the stopped rotor aircraft to a ground station.

9. The method recited in claim 7, wherein:

the stoppable rotor includes a first blade and a second blade; and when the stoppable rotor is stopped, the first blade is facing forward and the second blade is facing backward.

10. The method recited in claim 7, wherein:

the stoppable rotor includes a first blade and a second blade;

when the stoppable rotor is stopped, the first blade is facing forward and the second blade is facing backward; and the first blade is shorter than the second blade.

11. The method recited in claim 7, wherein:

the stoppable rotor includes a first blade and a second blade;

when the stoppable rotor is stopped, the first blade is facing forward and the second blade is facing backward; and the second blade includes a tailfin.

12. The method recited in claim 7, wherein:

the stoppable rotor includes a first blade and a second blade;

when the stoppable rotor is stopped, the first blade is facing forward and the second blade is facing backward; and the first blade is narrower than the second blade.

13. A computer program product, the computer program product being embodied in a non-transitory tangible computer readable storage medium and comprising computer instructions for:

launching a stopped rotor aircraft into flight using a stoppable rotor; and generating electricity using one or more wind turbines while the stopped rotor aircraft is flying, wherein the stoppable rotor is stopped at least some of the time while electricity is generated.

14. The computer program product recited in claim 13, wherein there is a tether which connects the stopped rotor aircraft to a ground station.

15. The computer program product recited in claim 13, wherein:

the stoppable rotor includes a first blade and a second blade; and when the stoppable rotor is stopped, the first blade is facing forward and the second blade is facing backward.

16. The computer program product recited in claim 13, wherein:

the stoppable rotor includes a first blade and a second blade;

when the stoppable rotor is stopped, the first blade is facing forward and the second blade is facing backward; and the first blade is shorter than the second blade.

17. The computer program product recited in claim 13, wherein:

the stoppable rotor includes a first blade and a second blade;

when the stoppable rotor is stopped, the first blade is facing forward and the second blade is facing backward; and the second blade includes a tailfin.

18. The computer program product recited in claim 13, wherein:

the stoppable rotor includes a first blade and a second blade;

when the stoppable rotor is stopped, the first blade is facing forward and the second blade is facing backward; and the first blade is narrower than the second blade.

\* \* \* \* \*